(12) United States Patent
Chen

(10) Patent No.: US 11,827,730 B2
(45) Date of Patent: Nov. 28, 2023

(54) GRAFT COPOLYMER AND USE THEREOF

(71) Applicant: ETERNAL MATERIALS CO., LTD., Kaohsiung (TW)

(72) Inventor: Wei-Chih Chen, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 27 days.

(21) Appl. No.: 17/513,265

(22) Filed: Oct. 28, 2021

(65) Prior Publication Data

US 2022/0135723 A1 May 5, 2022

(30) Foreign Application Priority Data

Oct. 30, 2020 (TW) ................................. 109137893

(51) Int. Cl.

| | | |
|---|---|---|
| C08F 261/04 | (2006.01) | |
| C08F 220/18 | (2006.01) | |
| C08F 220/06 | (2006.01) | |
| C08F 220/22 | (2006.01) | |
| C08F 220/56 | (2006.01) | |
| C08K 3/22 | (2006.01) | |
| H01M 4/62 | (2006.01) | |

(52) U.S. Cl.
CPC .......... *C08F 261/04* (2013.01); *C08F 220/06* (2013.01); *C08F 220/1806* (2020.02); *C08F 220/22* (2013.01); *C08F 220/56* (2013.01); *C08K 3/22* (2013.01); *H01M 4/623* (2013.01); *C08K 2003/2203* (2013.01)

(58) Field of Classification Search
CPC .... C08F 261/04; C08F 220/04; C08F 220/22; C08F 220/24; C08F 220/54; C08F 220/56
See application file for complete search history.

(56) References Cited

U.S. PATENT DOCUMENTS

2009/0035508 A1\* 2/2009 Parker ................... C08F 289/00
428/221
2014/0107275 A1 4/2014 Uemura et al.

FOREIGN PATENT DOCUMENTS

JP 2011-162637 \* 8/2011
WO 2012/023626 A1 10/2013

OTHER PUBLICATIONS

Translation of JP 2011-162637 (Year: 2011).\*
WO 2012/023626 A1 dated Oct. 28, 2013_English Abstract.

\* cited by examiner

*Primary Examiner* — Robert C Boyle
(74) *Attorney, Agent, or Firm* — LADAS & PARRY LLP

(57) ABSTRACT

The present invention provides a polyvinyl alcohol graft copolymer including a polyvinyl alcohol main chain. The polyvinyl alcohol graft copolymer includes branched chains including structural units derived from the following monomers: (a) a fluorine-including ethylenically unsaturated monomer, (b) an ethylenically unsaturated carboxylic acid monomer, and (c) an ethylenically unsaturated amide monomer. The present invention also provides an aqueous binder composition, and an electrode slurry composition including the polyvinyl alcohol graft copolymer.

8 Claims, No Drawings

GRAFT COPOLYMER AND USE THEREOF

CROSS REFERENCE TO THE RELATED APPLICATION

This application claims priority to Taiwanese Application No.: 109137893 filed 30 Oct. 2020, the contents of which is incorporated herein by reference.

BACKGROUND OF THE INVENTION

1. Field of the Invention

The present invention relates to a polyvinyl alcohol graft copolymer, and in particular, to a polyvinyl alcohol graft copolymer suitable for an alkaline environment. The present invention also relates to use of the polyvinyl alcohol graft copolymer in an aqueous binder composition and an electrode slurry composition.

2. Description of the Related Art

In recent years, in the field of chemical energy storage systems, lithium-ion batteries have received widespread attention due to characteristics such as relatively light weight, relatively high capacity (that is, relatively high energy density), high operating voltage, and long cycle life.

An electrode plate in a lithium-ion battery is a key component that plays an important role in battery performance. Specifically, the electrode plate affects the energy density, discharge capability, and cycle life of the battery. The electrode plate is mainly composed of active materials (such as positive and negative electrode materials), conductive materials (such as carbon black), binders, and metal current collectors (such as copper foil and aluminum foil).

Conventionally used negative electrode materials are carbon-based materials such as graphite, soft carbon, and hard carbon. However, in pursuit of higher energy density, silicon-based materials (such as silicon or silicon oxide) have been tried as the negative electrode material of the lithium-ion battery. Compared with the conventional carbon-based negative electrode materials, the silicon-based materials can greatly increase the energy density of the lithium-ion battery. However, the silicon-based materials are subjected to severe volume expansion (approximately 400%) during battery charging (the migration of lithium ions into the silicon-based materials). In the process of repeated charging and discharging, such severe volume expansion and contraction destroy the structure of a negative electrode plate. For example, conductive network collapse and/or electrode plate peeling result(s) in complete failure of the negative electrode, which has a very adverse effect on battery performance.

In another aspect, when a silicon-based material is used as a negative electrode active material of the lithium-ion battery, during first charging (lithium intercalation), the silicon-based material irreversibly reacts with lithium ions in an electrolyte to generate an inert solid electrolyte interface (SEI) that contains $Li_2O$ or $Li_4SiO_4$. The generation of the SEI consumes a large number of lithium ions, so that the irreversible capacity loss of the lithium-ion battery during first charging and discharging is excessively high, which severely limits the use of the silicon-based materials in high-energy density lithium-ion batteries.

To overcome the foregoing problem of excessively high irreversible capacity loss of the silicon-based negative electrode materials, a pretreatment technology has been developed. For example, lithium is added to the electrode material through pre-lithiation to offset the irreversible lithium loss caused by the formation of the SEI film, thereby improving first-cycle coulombic efficiency.

A binder is used for binding an electrode active material and a conductive material, to bond the electrode active material and the conductive material to the surface of the metal current collector. The adhesion of the binder is closely related to the cycle life of the battery. If the adhesion is inadequate, the electrode active material and the conductive material may fall off from the surface of the metal current collector during electrochemical cycling, resulting in pulverization of the electrode plate and causing the battery to lose electrochemical energy storage performance.

The binders commonly used in lithium-ion batteries typically include polyvinylidene difluoride (PVDF), carboxymethyl cellulose (CMC) polymers, acrylic polymers (PAA), styrene-butadiene rubber (SBR), polyvinyl alcohol (PVA), and the like. The PVDF binder is a relatively mature binder in the art at present and has adequate bonding performance. However, the PVDF binder is prone to swell in a commonly used electrolyte, which causes the stability of the electrode to decrease. The CMC and SBR are usually used together in graphite-based negative electrode active materials, have adequate viscoelasticity, and can provide graphite with adequate dispersibility, but cannot overcome the foregoing problem of volume expansion and contraction of the silicon-based materials. The PAA has a carboxyl group, which can form a hydrogen bonding force with the surface of the silicon-based material to inhibit the volume expansion of the silicon-based material. However, the PAA has the problem of being hygroscopic, and thus an electrode plate has to be dried at a relatively high temperature for a relatively long time when the PAA is used in the manufacture of the electrode plate. In addition, the PAA usually needs to be used together with the CMC and/or SBR to avoid the problem of brittleness of a pure PAA.

Among currently developed binder materials, there are binder materials that can overcome the problem of volume expansion and contraction of the silicon-based negative electrode material, such as a PAA or an improved PAA-based binder material, which have adequate adhesion to the metal current collectors (such as copper foil and aluminum foil) in an acidic environment. However, as described above, the pretreatment technology for the negative electrode materials has been developed on high-energy density batteries. The negative electrode material after pretreatment (for example, but not limited to, pre-lithiation or pre-magnesation) is alkaline, and the alkaline environment causes the PAA binder material to fail to firmly adhere to the surface of a metal current collector (such as copper foil and aluminum foil), resulting in reduced adhesion. Therefore, various materials in the electrode plate cannot be firmly bonded and are prone to fall off, thereby affecting the electrochemical performance of the obtained battery.

Therefore, the development of a suitable binder, which can overcome the problems of cracking of a coating and volume expansion and contraction of the silicon-based negative electrode material, and can maintain adequate adhesion in an alkaline electrode slurry, is a technical issue that a person skilled in the art is eager to address.

SUMMARY OF THE INVENTION

In view of this, a polyvinyl alcohol graft copolymer that can resolve the foregoing problems has been found after research.

One objective of the present invention is to provide a novel polyvinyl alcohol graft copolymer comprising a polyvinyl alcohol main chain. The polyvinyl alcohol graft copolymer includes branched chains comprising structural units derived from the following monomers:

(a) a fluorine-containing ethylenically unsaturated monomer;

(b) an ethylenically unsaturated carboxylic acid monomer; and (c) an ethylenically unsaturated amide monomer.

Another objective of the present invention is to provide an aqueous binder composition including the foregoing polyvinyl alcohol graft copolymer. In an embodiment, the pH value of the aqueous binder composition is between 7 and 13.

Still another objective of the present invention is to provide an electrode slurry composition including the foregoing aqueous binder composition.

In the manufacture of an electrode plate, the polyvinyl alcohol graft copolymer of the present invention may be used as a single agent. That is, the polyvinyl alcohol graft copolymer of the present invention may replace CMC/SBR without being used with other binders, which can simplify the process and reduce costs. However, despite of this, the polyvinyl alcohol graft copolymer of the present invention may still be used with other binders (such as CMC/SBR). In addition, the polyvinyl alcohol graft copolymer of the present invention can avoid the problem of brittleness of a pure PAA, and the manufactured electrode plate has flexibility and is not prone to cracking after winding, so that the operability is adequate. Moreover, the polyvinyl alcohol graft copolymer of the present invention can alleviate the problem of hygroscopy of the PAA, and the obtained electrode plate can be dried easily, so that the energy consumption required for drying can be reduced.

It is surprisingly found that the polyvinyl alcohol graft copolymer of the present invention can maintain adequate adhesion in an alkaline environment, and the manufactured electrode plate is not prone to pulverization, so that the polyvinyl alcohol graft copolymer is particularly suitable for use as an aqueous binder in the alkaline electrode slurry composition (for example, but not limited to, the electrode slurry composition containing pre-lithiated or pre-magnesated silicon-based negative electrode active materials). The manufactured electrode plate has adequate physical and electrochemical properties, thereby increasing the cycle life of the battery.

DETAILED DESCRIPTION

For ease of understanding of the disclosed content described in this specification, a plurality of terms are defined as follows.

The term "approximately" or "about" means an acceptable error of a specific value measured by a person skilled in the art, and a range of the error depends on how the value is measured or determined.

In this specification, unless specifically limited, "a" and "the" in a singular form also include a plural form thereof. Any and all embodiments and exemplary phrases ("for example" and "such as") herein are only for the purpose of highlighting the present invention, and are not intended to limit the scope of the present invention. The terms in this specification are not to be construed as implying that any methods and conditions not claimed can constitute essential features when the present invention is implemented.

For the term "or" used in a list including two or more items, the following description is included: any item of the list, all items of the list, and any combination of items of the list.

In this specification, the term "structural unit" refers to the smallest unit with the same chemical composition in a copolymer after monomers are polymerized to form the copolymer, and is also referred to as a repeating unit.

In this specification, the term "ethylenically unsaturated monomer" refers to a monomer with at least one double bond —C=C—.

In this specification, the term "fluorine-containing ethylenically unsaturated monomer" refers to a monomer with at least one double bond —C=C— and at least one fluorine atom.

In this specification, the term "alkyl" refers to saturated straight or branched hydrocarbyl, having 1 to 12 carbon atoms, preferably 1 to 8 carbon atoms, more preferably 1 to 6 carbon atoms, and particularly preferably 1 to 4 carbon atoms, and examples thereof include, but are not limited to, methyl, ethyl, n-propyl, isopropyl, n-butyl, isobutyl, tertiary butyl, pentyl, hexyl, and similar groups thereof.

In this specification, the term "cycloalkyl" refers to a saturated hydrocarbon ring having 3 to 12 carbon atoms. The cycloalkyl includes monocyclic alkyl or polycyclic alkyl (such as bicyclic alkyl or tricyclic alkyl), and may include bridging atoms. Some non-limiting examples of the cycloalkyl include cyclopropyl, cyclobutyl, cyclopentyl, cyclohexyl, cycloheptyl, cyclooctyl, dinonyl, didecyl, bicyclo[2.1.0]pentane, bicyclo[2.2.1]heptane, bicyclo[4.4.0]decane, and adamantane.

In this specification, the term "alkoxy" refers to a group formed from an alkyl group bonded to an oxygen atom, where the alkyl group has the foregoing definition. Some non-limiting examples of the alkoxy include methoxy, ethoxy, n-propoxy, isopropoxy, n-butoxy, isobutoxy, and tertiary butoxy.

In this specification, the term "aryl" is preferably a monocyclic or polycyclic aromatic carbocyclic group with 6 to 20 carbon atoms, and may also contain fused rings, preferably 1, 2, 3, or 4 fused or non-fused rings. The examples thereof include, but are not limited to, phenyl, indenyl, naphthyl, fluorenyl, anthryl, phenanthryl, and similar groups thereof. According to some preferred embodiments of the present invention, the aryl is phenyl, biphenyl, or naphthyl.

In this specification, the term "aralkyl" refers to an alkyl group substituted with an aryl group or an aryl group substituted with an alkyl group, where the aryl group and the alkyl group have the foregoing definition. The aralkyl may have 7 to 30 carbon atoms, preferably 7 to 25 carbon atoms, more preferably 7 to 20 carbon atoms, and particularly preferably 7 to 15 carbon atoms. The examples of the aralkyl include, but are not limited to, benzyl, benzhydryl, phenethyl, phenylpropyl, and similar groups thereof.

In this specification, the term "aryloxy" refers to a group formed from an aryl group bonded to an oxygen atom, where the aryl group has the foregoing definition.

In this specification, the term "amino" refers to a —$NH_2$ group, "monoalkylamino" refers to the amino substituted with one alkyl group, and "dialkylamino" refers to the amino substituted with two alkyl groups, where the alkyl group has the foregoing definition.

In this specification, the term "ethylenically unsaturated carboxylic acid monomer" refers to a monomer with at least one double bond —C=C— and at least one carboxylic acid group.

In this specification, the term "ethylenically unsaturated amide monomer" refers to a monomer with at least one double bond —C=C— and at least one amide group.

In this specification, the term "(meth)acrylic acid" refers to "acrylic acid or methacrylic acid", the term "(meth)acrylic monomer" refers to "acrylic monomer or methacrylic monomer", the term "(meth)acrylamide" refers to "acrylamide or methacrylamide", and other related terms may be deduced by analogy.

The content of the present invention is described in detail below.

Polyvinyl Alcohol Graft Copolymer

The polyvinyl alcohol graft copolymer of the present invention is obtained by graft copolymerization of polyvinyl alcohol (as a main chain) with a fluorine-containing ethylenically unsaturated monomer, an ethylenically unsaturated carboxylic acid monomer, an ethylenically unsaturated amide monomer, and other optional monomers.

The polyvinyl alcohol used in the present invention is not particularly limited, and preferably has a weight-average molecular weight ranging from 10,000 to 400,000. A lower limit of the weight-average molecular weight of polyvinyl alcohol may be 10,000, preferably 12,000 or 15,000. An upper limit of the weight-average molecular weight of polyvinyl alcohol may be 400,000, preferably 350,000, 300,000, 250,000, or 200,000.

Specific embodiments of the polyvinyl alcohol used in the present invention include, but are not limited to, PVA 088-20 (Sinopec) and GOHSENOL GL-05 (Nippon Synthetic Chem Industry Co., Ltd.).

The fluorine-containing ethylenically unsaturated monomer (component (a)) used in the present invention may be, but is not limited to, (meth)acrylic acid fluoroalkyl ester, (meth)acrylic acid fluoroaryl ester, (meth)acrylic acid fluoroaralkyl ester, (meth)acrylic acid perfluoroalkyl ester, (fluoroalkyl)acrylic acid alkyl ester, (fluoroalkyl)acrylic acid aryl ester, or (fluoroalkyl)acrylic acid aralkyl ester, preferably (meth)acrylic acid fluoroalkyl ester or (fluoroalkyl)acrylic acid alkyl ester. Specific examples include, but are not limited to, trifluoromethyl (meth)acrylate, 2,2,2-trifluoroethyl (meth)acrylate, 2,2,3,3-tetrafluoropropyl (meth)acrylate, 2,2,3,4,4,4-hexafluorobutyl (meth)acrylate, perfluorooctyl (meth)acrylate, and methyl (trifluoromethyl) acrylate.

According to a preferred embodiment of the present invention, the fluorine-containing ethylenically unsaturated monomer (component (a)) has chemical formula (1):

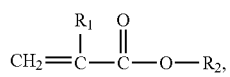

where at least one of $R_1$ and $R_2$ is a group substituted with a fluorine atom, and $R_1$ and $R_2$ have the following definitions:

$R_1$ is H, $C_1$-$C_4$ alkyl, or $C_1$-$C_4$ alkyl substituted with one or more fluorine atoms; and $R_2$ is H, $C_1$-$C_{12}$ alkyl, $C_1$-$C_{12}$ alkyl substituted with one or more fluorine atoms, aryl, aryl substituted with one or more fluorine atoms, aralkyl, or aralkyl substituted with one or more fluorine atoms.

According to some embodiments of the present invention, $R_1$ is preferably H, $C_1$-$C_3$ alkyl, or $C_1$-$C_3$ alkyl substituted with one or more fluorine atoms, and more preferably H, methyl, or trifluoromethyl.

According to some embodiments of the present invention, $R_2$ is preferably H, $C_1$-$C_8$ alkyl, $C_1$-$C_8$ alkyl substituted with one or more fluorine atoms, $C_6$-$C_{20}$ aryl, $C_6$-$C_{20}$ aryl substituted with one or more fluorine atoms, $C_6$-$C_{20}$ aryl-$C_1$-$C_{12}$ alkyl, or $C_6$-$C_{20}$ aryl-$C_1$-$C_{12}$ alkyl substituted with one or more fluorine atoms.

According to some embodiments of the present invention, the fluorine-containing ethylenically unsaturated monomer has the chemical formula (1), where $R_1$ is H or $C_1$-$C_4$ alkyl, and $R_2$ is $C_1$-$C_{12}$ alkyl substituted with one or more fluorine atoms. According to a preferred embodiment of the present invention, $R_1$ is H or $C_1$-$C_3$ alkyl, and $R_2$ is $C_1$-$C_5$ alkyl substituted with one or more fluorine atoms.

According to some embodiments of the present invention, based on 100 parts by weight of polyvinyl alcohol, the content of component (a) is 20 parts by weight or more, preferably 25 parts by weight or more, and more preferably 30 parts by weight or more. If the content of component (a) is excessively low, the obtained electrode plate may easily absorb moisture, resulting in an excessively high water content and poor electrical properties. An upper limit of the content of component (a) is theoretically not particularly limited. However, excessively high content of component (a) may cause the polyvinyl alcohol graft copolymer to precipitate due to poor water solubility, resulting in instability of the graft copolymer solution. Therefore, the content of component (a) may be adjusted properly to avoid precipitation. According to some embodiments of the present invention, based on 100 parts by weight of polyvinyl alcohol, the content of component (a) is preferably not more than 160 parts by weight, more preferably not more than 150 parts by weight, and particularly preferably not more than 140 parts by weight.

The ethylenically unsaturated carboxylic acid monomer (component (b)) used in the present invention may be, but is not limited to, (meth)acrylic acid, maleic acid, fumaric acid, itaconic acid, 2-ethylacrylic acid, isocrotonic acid, α-acetoxy acrylic acid, or β-trans-aryloxy acrylic acid.

According to some embodiments of the present invention, the ethylenically unsaturated carboxylic acid monomer (component (b)) used in the present invention has chemical formula (2):

where $R_3$ is H or $C_1$-$C_4$ alkyl, preferably methyl; and $R_4$ is —OH.

According to some embodiments of the present invention, based on 100 parts by weight of polyvinyl alcohol, the content of component (b) is 500 parts by weight to 2500 parts by weight, preferably 520 parts by weight to 2000 parts by weight, more preferably 530 parts by weight to 1800 parts by weight, and particularly preferably 550 parts by weight to 1200 parts by weight. If the content of component (b) is excessively low, the obtained binder is not well adhered to the electrode plate, and active materials easily fall off from the electrode plate. If the content of component (b) is excessively high, the obtained binder is excessively hard and brittle, is prone to cracking after winding, and has difficulty in handling in processes.

It is found through experiments that an electrode slurry containing the pre-treated (for example, pre-lithiated) silicon-based negative electrode active materials is alkaline, resulting in poor adhesion of the conventional PAA binder. However, the polyvinyl alcohol graft copolymer of the present invention, which includes an ethylenically unsaturated amide monomer (component (c)) for graft copolymerization, can not only overcome the problem of volume expansion and contraction of the silicon-based negative electrode material, but can also maintain adequate adhesion in an alkaline environment, and the obtained coating has good properties and is not prone to pulverization or cracking. In one aspect, the polyvinyl alcohol graft copolymer of the present invention may form hydrogen bonds in the alkaline environment due to the amide group (—C(═O)NH—) from the ethylenically unsaturated amide monomer, and the silicon-based material can be fixed in the coating through the hydrogen bonds, thereby reducing the possibility of pulverization. In another aspect, the polyvinyl alcohol graft copolymer of the present invention may form a covalent bond with a metal current collector (for example, copper foil) due to a lone pair on the amide group of the ethylenically unsaturated amide monomer, thereby improving the adhesion. Therefore, the polyvinyl alcohol graft copolymer of the present invention is particularly suitable for use as a binder in the alkaline environment (for example, the pretreated silicon-based electrode material), and the manufactured electrode plate has adequate physical and electrochemical properties, thereby increasing the cycle life of the battery.

According to some embodiments of the present invention, the ethylenically unsaturated amide monomer (component (c)) used in the present invention has chemical formula (3):

where
$R_5$ is H or $C_1$-$C_4$ alkyl;
$R_6$ is H, $C_1$-$C_{10}$ alkyl, aryl, aralkyl, cycloalkyl,

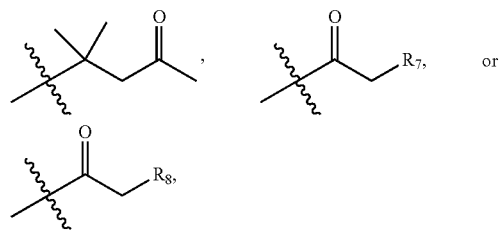

wherein the $C_1$-$C_{10}$ alkyl, aryl, aralkyl, or cycloalkyl may be unsubstituted or substituted with amino, monoalkylamino, or dialkylamino;
$R_7$ is H or $C_1$-$C_5$ alkyl, wherein the $C_1$-$C_5$ alkyl may be unsubstituted or substituted with amino, monoalkylamino, or dialkylamino; and
$R_8$ is $C_1$-$C_{10}$ alkyl.

According to some embodiments of the present invention, the ethylenically unsaturated amide monomer (component (c)) used in the present invention may be, but is not limited to, (meth)acrylamide, N-methyl(meth)acrylamide, N-ethyl(meth)acrylamide, N-n-propyl(meth)acrylamide, N-isopropyl(meth)acrylamide, N-n-butyl(meth)acrylamide, N-sec-butyl(meth)acrylamide, N-tert-butyl(meth)acrylamide, N-hexyl(meth)acrylamide, N-benzyl(meth)acrylamide, N-(3-dimethylaminopropyl)(meth)acrylamide, N-hydroxymethyl(meth)acrylamide, diacetone(meth)acrylamide, N-(methoxymethyl)(meth)acrylamide, N-(butoxymethyl)(meth)acrylamide, N-phenyl(meth)acrylamide, N-(3-methylphenyl)(meth)acrylamide, N-cyclohexyl(meth)acrylamide, N-cyclopentyl(meth)acrylamide, N-(meth)acryloyl ethyl carbamate, or a combination thereof, preferably N-methylolacrylamide, acrylamide, methacrylamide, N-(methoxymethyl)acrylamide, N-(butoxymethyl)acrylamide, or a combination thereof.

According to some embodiments of the present invention, the weight ratio of component (b) to component (c) [component (b):component (c)] is 50:1 to 2:1, preferably 40:1 to 2.5:1, more preferably 30:1 to 3:1, and particularly preferably 25:1 to 3.5:1. If the content of component (c) is excessively low, the obtained binder has poor adhesion in the alkaline environment. If the content of component (c) is excessively high, capacity retention is low.

According to some embodiments of the present invention, the branched chains of the polyvinyl alcohol graft copolymer of the present invention may further include a structural unit derived from an ethylenically unsaturated carboxylate monomer (component (d)).

According to some embodiments of the present invention, the ethylenically unsaturated carboxylate monomer (component (d)) may be, but is not limited to, methyl (meth)acrylate, ethyl (meth)acrylate, propyl (meth)acrylate, butyl (meth)acrylate, hexyl (meth)acrylate, octyl/isooctyl (meth)acrylate, isodecyl (meth)acrylate, lauryl (meth)acrylate, isobornyl (meth)acrylate, 2-phenoxyethyl acrylate, cumyl phenoxy ethyl acrylate, phenyl phenoxy ethyl acrylate, or β-carboxyethyl acrylate.

According to some embodiments of the present invention, the ethylenically unsaturated carboxylate monomer (component (d)) used in the present invention has chemical formula (4):

where $R_9$ is H or $C_1$-$C_4$ alkyl, preferably H or $C_1$-$C_3$ alkyl, and more preferably H or methyl; and $R_{10}$ is $C_1$-$C_{12}$ alkyl, $C_3$-$C_{12}$ cycloalkyl or aryl, preferably $C_1$-$C_8$ alkyl, $C_5$-$C_{10}$ cycloalkyl or phenyl.

According to some embodiments of the present invention, based on 100 parts by weight of polyvinyl alcohol, the content of component (d) is 0 parts by weight to 80 parts by weight, 0 parts by weight to 70 parts by weight, 0 parts by weight to 60 parts by weight, 0 parts by weight to 50 parts by weight, 0 parts by weight to 40 parts by weight, 0 parts by weight to 30 parts by weight, 0 parts by weight to 20 parts by weight, and 0 parts by weight to parts by weight, preferably 5 parts by weight to 75 parts by weight, 10 parts by weight to 65 parts by weight, 15 parts by weight to 55 parts by weight, or 20 parts by weight to 45 parts by weight.

The polyvinyl alcohol graft copolymer of the present invention can be used as an aqueous binder, can provide the desired flexibility without additional CMC/SBR, is not prone to cracking after winding, and has adequate operability, which can resolve the problem of brittleness in the related art. In addition, the fluorine-containing ethylenically unsaturated monomer grafted to the main chain can effectively alleviate the problem of easy moisture absorption of the electrode plate. Therefore, when the fluorine-containing ethylenically unsaturated monomer is used in the manufacture of the electrode plate, drying conditions can be reduced, and the performance of the battery can be greatly improved.

Moreover, by grafting the ethylenically unsaturated carboxylic acid monomer, the obtained graft copolymer can have adequate adhesion to the surface of the material in contact, which effectively improves the adhesion of the electrode plate, which is thus not prone to pulverization, thereby increasing the cycle life of the battery.

More advantageously, by grafting the ethylenically unsaturated amide monomer, compared with the binder in the related art, the polyvinyl alcohol graft copolymer of the present invention is not only suitable for an alkaline environment, but also has excellent adhesion in the alkaline environment. When the polyvinyl alcohol graft copolymer of the present invention is used in an alkaline electrode slurry composition, the manufactured electrode plate has strong adhesion to the metal current collector, and the materials in the electrode plate firmly adhere to each other and are not prone to pulverization, thereby improving the electrochemical performance of the electrode plate.

Preparation Method of the Polyvinyl Alcohol Graft Copolymer

The polyvinyl alcohol graft copolymer of the present invention may be prepared by any suitable method. In an embodiment of the present invention, the polyvinyl alcohol graft copolymer may be prepared by the following method:
(1) Dissolve polyvinyl alcohol in a solvent to obtain a polyvinyl alcohol solution.
(2) Optionally introduce an inert gas into the polyvinyl alcohol solution in step (1) to remove oxygen in the solution.
(3) Add a fluorine-containing ethylenically unsaturated monomer, an ethylenically unsaturated carboxylic acid monomer, an ethylenically unsaturated amide monomer, optionally an ethylenically unsaturated carboxylate monomer or other monomers, and an initiator into the solution obtained in step (2).
(4) Heat up for polymerization to covalently graft the fluorine-containing ethylenically unsaturated monomer, the ethylenically unsaturated carboxylic acid monomer, the ethylenically unsaturated amide monomer, and optionally the ethylenically unsaturated carboxylate monomer to the polyvinyl alcohol to obtain the polyvinyl alcohol graft copolymer.

The solvent used in step (1) is an aqueous medium, for example, but not limited to, ultrapure water, ion exchange water, reverse osmosis water, distilled water, or deionized water, preferably deionized water.

The initiator used in step (3) may be any suitable initiator known to a person of ordinary skill in the art of the present invention, for example, but not limited to, persulfate. The specific examples of persulfate include, but are not limited to, ammonium persulfate, potassium persulfate, sodium persulfate, lithium persulfate, potassium peroxymonosulfate, or a combination thereof, preferably ammonium persulfate or sodium persulfate.

In step (4), the initiator decomposes into free radicals at a reaction temperature, and the introduction of the free radicals on molecular chains of polyvinyl alcohol initiates the fluorine-containing ethylenically unsaturated monomer, the ethylenically unsaturated carboxylic acid monomer, the ethylenically unsaturated amide monomer, and optionally the ethylenically unsaturated carboxylate monomer to undergo free radical polymerization and to be covalently grafted to the polyvinyl alcohol. The reaction temperature is usually approximately 30-100° C., for example, 70° C. The time for completion of the polymerization depends on an actual situation, and is usually 0.5-12 h, for example, approximately 4 h.

Aqueous Binder Composition and Preparation Method Thereof

The polyvinyl alcohol graft copolymer of the present invention has adequate compatibility with an aqueous medium, and can be formulated with the aqueous medium to form an aqueous binder composition. The solvent may be a solvent from the process of preparing the polyvinyl alcohol graft copolymer, or optionally may be added to adjust the viscosity after the preparation is completed. The foregoing aqueous medium is as described above.

Compared with the use of an organic solvent, the use of an aqueous medium incurs lower costs, is non-toxic and less likely to pollute the environment, and poses a lower health risk to an operator.

Optionally, any additive known to a person of ordinary skill in the art of the present invention, for example, but not limited to, an alkaline compound or a cross-linking agent, may be added to the aqueous binder composition of the present invention. The alkaline compound is, for example, lithium hydroxide, sodium hydroxide, potassium hydroxide, ammonium hydroxide, or a mixture thereof, preferably lithium hydroxide or sodium hydroxide. The pH value of the aqueous binder composition may be adjusted by adding the alkaline compound.

In a preferred embodiment of the present invention, for example, a 5 wt % lithium hydroxide aqueous solution may be used to adjust the pH value of the aqueous binder composition to 7 to 13 (such as 7, 8, 9, 10, 11, 12, or 13), preferably 8 to 13, more preferably 8 to 12, and particularly preferably 9 to 11. In some embodiments, the pH value of the aqueous binder composition is adjusted to be equivalent to the pH value of the silicon-based negative electrode active material that is alkaline after pretreatment (for example, pre-lithiation), so that the adhesion of the aqueous binder composition to the alkaline silicon-based material is increased.

The aqueous binder composition of the present invention including the polyvinyl alcohol graft copolymer may be used as a single agent, and can provide the desired flexibility without additional CMC/SBR. The manufactured electrode plate has flexibility and is not prone to cracking after winding, so that the operability is adequate. In addition, the electrode plate manufactured by using the aqueous binder composition is not easy to absorb moisture, so that the electrode plate is easy to dry, and the energy consumption required for drying can be reduced. More advantageously, the aqueous binder composition of the present invention has excellent adhesion even in the alkaline environment, and therefore, is suitable for the electrode slurry containing the alkaline silicon-based material.

According to a specific embodiment of the present invention, the aqueous binder composition of the present invention contains 1 wt % to 10 wt % of polyvinyl alcohol graft copolymer (based on the total weight of the aqueous binder composition), for example, 1 wt %, 2 wt %, 3 wt %, 4 wt %, 5 wt %, 6 wt %, 7 wt %, 8 wt %, 9 wt %, or 10 wt % of polyvinyl alcohol graft copolymer, preferably 2 wt % to 8 wt % or 3 wt % to 7 wt % of polyvinyl alcohol graft copolymer, and more preferably 4 wt % to 6 wt % of polyvinyl alcohol graft copolymer.

The aqueous binder composition of the present invention may be prepared by any suitable method. The polyvinyl alcohol graft copolymer, the aqueous medium, and optionally the additive are thoroughly stirred for preparation.

Electrode Slurry Composition and Preparation Method Thereof

The present invention also provides an electrode slurry composition including an active material, a conductive material, and the polyvinyl alcohol graft copolymer (as a binder) of the present invention.

Based on the total weight of the solid content of the electrode slurry composition, the polyvinyl alcohol graft copolymer of the present invention has the following content: 0.1-20 wt %, 0.2-15 wt %, 0.5-10 wt %, 0.8-8 wt %, or 1-5 wt %.

In some embodiments, the active material is a negative electrode active material including, but not limited to, graphite, hard carbon, soft carbon, silicon, silicon oxide ($SiO_x$), silicon carbon, or a combination of the foregoing materials, preferably a silicon-based material. In some embodiments, the negative electrode active material may be pre-treated, for example, but not limited to, pre-lithiated or pre-magnesated. Taking the pre-lithiation as an example, the negative electrode active material may be, for example, but not limited to, a pre-lithiated silicon-based negative electrode active material (such as a pre-lithiated silicon negative electrode material, a pre-lithiated silicon oxide negative electrode material, and a pre-lithiated silicon alloy negative electrode material). Based on the total weight of the solid content of the electrode slurry composition, the negative electrode active material has the following content: 50-99 wt %, 60-99 wt %, 70-99 wt %, 80-99 wt %, 85-98 wt %, or 90-97 wt %.

The conductive material includes, but is not limited to, conductive graphite, carbon black, carbon fiber, carbon nanotube, graphene, or a combination of the foregoing materials. Based on the total weight of the solid content of the electrode slurry composition, the conductive material has the following content: 1-30 wt %, 1-20 wt %, 1-10 wt %, or 1-5 wt %, preferably 1-15 wt %, 1-10 wt %, or 2-5 wt %.

According to an embodiment of the present invention, the electrode slurry composition further includes an additive. The additive includes an alkaline compound, for example, but not limited to, lithium hydroxide, sodium hydroxide, potassium hydroxide, ammonium hydroxide, or a mixture thereof, preferably lithium hydroxide or sodium hydroxide. In a preferred embodiment of the present invention, for example, a 5 wt % lithium hydroxide aqueous solution may be used to adjust the pH to 8 to 14 (such as 8, 9, 10, 11, 12, 13, or 14), preferably 8.5 to 13, and more preferably 9 to 12.

According to an embodiment of the present invention, the additive includes a dispersant.

According to an embodiment of the present invention, the electrode slurry composition further includes an aqueous medium including, but not limited to, distilled water or deionized water, preferably deionized water. A person of ordinary skill in the art of the present invention can add a proper amount of aqueous medium according to use requirements to adjust the viscosity to be suitable for use.

The electrode slurry composition of the present invention has high stability. The viscosity of the electrode slurry composition of the present invention remains within a particular range (for example, within the range of ±10% of initial viscosity) for a particular period of time without drastic increase. The electrode slurry composition of the present invention has a long storage time, thereby improving operation convenience. The electrode plate manufactured by using the electrode slurry composition has excellent adhesion and elasticity, is not prone to pulverization and brittleness, and has excellent electrochemical performance.

The present invention is further described in the following examples, but it is to be understood that the following examples are merely illustrative and are not to be construed as limiting the implementations of the present invention.

PREPARATION EXAMPLES

Preparation of the Polyvinyl Alcohol Graft Copolymer

Preparation Examples 1 to 5: Polyvinyl alcohol (referred to as PVA below) GOHSENOL GL-05 (Nippon Synthetic Chem Industry Co., Ltd.) was dissolved in 7200 mL of water to obtain a uniform, transparent, and viscous polyvinyl alcohol aqueous solution after thorough stirring. Nitrogen gas was continuously introduced for approximately 60 min to remove oxygen in the aqueous solution. 2,2,2-trifluoroethyl (meth)acrylate (Sigma-Aldrich, a purity of 99%), (meth)acrylic acid (Sigma-Aldrich, a purity of 99%), (meth)acrylamide (Sigma-Aldrich, a purity of 98%), hexyl (meth)acrylate (Sigma-Aldrich, a purity of 99%), and 1% of sodium persulfate aqueous solution were then added and stirred for uniform mixing, and the temperature was increased to 70° C. for continuous reaction for 4 h, so that the polyvinyl alcohol graft copolymer (referred to as graft PVA below) was obtained as an aqueous binder (the solid content was 5.2 wt %) of the Preparation Examples 1 to 5. The amount of reactants used for each graft PVA was recorded in Table 1.

Preparation Examples 6 and 7: N-methylolacrylamide (Merck, a purity of 48%) was further added as an ethylenically unsaturated amide monomer. The remaining preparation steps were the same as those in the foregoing Preparation Examples 1 to 5, and the amounts of reactants used were recorded in Table 1. The solid content of the obtained product was 5.2 Wt %.

Preparation Example 8: Polyvinyl alcohol (referred to as PVA below) GOHSENOL GL-05 (Nippon Synthetic Chem Industry Co., Ltd.) was dissolved in 7200 mL of water to obtain a uniform, transparent, and viscous polyvinyl alcohol aqueous solution after thorough stirring. Nitrogen gas was continuously introduced for approximately 60 min to remove oxygen in the aqueous solution. 2,2,2-trifluoroethyl (meth)acrylate (Sigma-Aldrich, a purity of 99%), (meth)acrylic acid (Sigma-Aldrich, a purity of 99%), hexyl (meth)acrylate (Sigma-Aldrich, a purity of 99%), and 1% sodium persulfate aqueous solution were then added and stirred for uniform mixing, and the temperature was increased to 70° C. for continuous reaction for 4 h, so that the polyvinyl alcohol graft copolymer (referred to as graft PVA below) was obtained, and the Preparation Example 8 (the solid content was 5.2 wt %) was obtained.

Preparation of the Electrode Slurry Composition

Examples 1 to 7 and Comparative Example 1: 36.7 g of the graft PVA solution (the solid content: 5.2 wt %), 56.4 g of pre-treated alkaline silicon oxide/graphite negative electrode active material (BTR-6002A, BTR New Material Group Co., Ltd.), and 1.8 g of carbon black (Super P, Taiwan Maxwave Co., Ltd.) were added into a planetary mixer with a disperser and mixed uniformly at 25° C., and a proper amount of deionized water was added to adjust viscosity, so that a negative electrode slurry was prepared.

Comparative Example 2: 2 g of CMC (Ashland Inc., Bondwell™, BVH-8) was dissolved in 98 mL of water to prepare 2 wt % CMC aqueous solution. 56.4 g of pre-treated alkaline silicon oxide/graphite negative electrode active material (BTR-6002A, BTR New Material Group Co., Ltd.) and 1.8 g of carbon black (Super P, Taiwan Maxwave Co., Ltd.) were added to 39 g of 2 wt % CMC aqueous solution and thoroughly stirred. Subsequently, 2.3 g of 45 wt % SBR (JSR, TRD104A) was then added and thoroughly stirred. The negative electrode slurry containing CMC/SBR was thus obtained.

Comparative Example 3: 2 g of PAA (Sigma-Aldrich, PAA450000) was dissolved in 98 mL of water to prepare 2 wt % PAA aqueous solution. 56.4 g of pre-treated alkaline silicon oxide/graphite negative electrode active material (BTR-6002A, BTR New Material Group Co., Ltd.) and 1.8 g of carbon black (Super P, Taiwan Maxwave Co., Ltd.) were added to 39 g of the 2 wt % PAA aqueous solution and thoroughly stirred. Subsequently, 2.22 g of 45 wt % SBR (JSR, TRD104A) was then added and thoroughly stirred. The negative electrode slurry containing PAA/SBR was thus obtained.

The amount of the components and the viscosity of the slurry were recorded in Table 2.

Preparation of the Electrode Plate

The prepared electrode slurry composition was coated on a copper foil (a 10 μm copper foil for battery, Chang Chun Group) by using a scraper (the coating weight: 5-7 mg/cm$^2$). After being dried at 100° C. for 5 min and being cold pressed, the coated copper foil was cut into a circle with a cutter having a diameter of 12 mm and placed into a vacuum oven at 100° C. for 6 h to obtain the negative electrode plate.

Preparation of the Button Cell

The composition of the used electrolyte included 2% of ethylene carbonate (EC)/diethyl carbonate (DEC)-vinylene carbonate (VC), 8% of fluoroethylene carbonate (FEC), and lithium hexafluorophosphate (Formosa Plastics Group: LE). A separator membrane was a polypropylene film with a thickness of approximately 20 m.

The foregoing negative electrode plate and other parts were assembled into a standard button cell (CR2032) by a conventional method, and the performance thereof was tested. The assembly process was sequentially as follows: a bottom cover of the cell, a lithium plate (as the positive electrode), a separator membrane, a negative electrode plate, a metal gasket, a spring plate, and a top cover of the cell.

The assembled battery was left still for approximately 2-3 h to allow the electrolyte to thoroughly permeate into the electrodes to improve conductivity. The open circuit voltage of the obtained battery was approximately 2.5-3 V.

Test Method

1. Fineness Measurement

After stirring, a proper amount of an aqueous binder slurry was dripped to the deepest part of the groove of a fineness meter (brand: PSIS-303-50). A scraper was in vertical contact with the fineness meter and was pulled from the largest-scale part to the smallest-scale part to observe where in the groove particles are present prominently. The corresponding scale value, which is the fineness, was recorded.

2. Water Content Test

A Coulometric Karl-Fischer moisture titrator was used for testing. The electrode plate sample was placed in a sealed sample bottle and heated to 130° C. for 7 min to evaporate the moisture in the electrode plate sample. Dry gas was introduced to feed the water vapor into an electrolyzer to participate in a reaction. The amount of electricity was then measured in the electrolysis process to determine the water content.

The electrode plate including CMC/SBR as a binder (Comparative Example 2) was used as a control group (the comparison reference). "□" represents that the water content is reduced by more than 20% compared with the electrode plate of Comparative Example 2; "Δ" represents that the water content is reduced by 10-20% compared with the electrode plate of Comparative Example 2; and "X" represents that the water content is reduced by less than 10% compared with the electrode plate of Comparative Example 2. The results were recorded in Table 2.

3. Adhesion Measurement

A 3M 610 tape was used to closely adhere to the dried electrode plate, and a tension meter (model: RX-100, MOGRL Technology Co., Ltd.) was then used for a 180-degree tensile test.

4. Slurry Stability Test

After the electrode slurry composition was prepared, the initial viscosity thereof was tested. After the electrode slurry composition was left at room temperature overnight, the viscosity thereof was tested again. The viscosity change of the electrode slurry composition was compared. "□" represents that the viscosity change is less than 10% compared with the initial viscosity; "Δ" represents that the viscosity change is 10-20% compared with the initial viscosity; and "X" represents that the viscosity change is more than 20% compared with the initial viscosity.

5. Electrode Plate Cracking Test

The electrode plate with a coating weight greater than 7 mg/cm$^2$ was wound around a 3 mm cylindrical rod. After unwinding, it was observed whether there are cracks on the surface. "□" represents that there are fewer than 5 cracks; "Δ" represents that there are 5 or more cracks; and "X" represents that the coating is peeled off.

6. Capacity Retention Test

A charge and discharge machine (model: LBT21084) of Arbin Instruments was used to measure battery performance.

Pre-Work:

Charge: a constant current mode in which a constant current of 0.1 C was set for charging for 10 h, followed by a constant voltage mode in which a constant voltage of 0.01 V was set for charging for 1 h.

Discharge: Discharge with a current of 0.1 C for 10 h.

The charge and discharge were repeated 3 times under the foregoing conditions, where the first 3 cycles were used to form an SEI.

Discharge capacity of the 1st cycle and the 50th cycle:

Charge: a constant current mode in which a constant current of 0.5 C was set for charging for 2 h, followed by a constant voltage mode in which a constant voltage of 0.01 V was set for charging for 1 h.

Discharge: Discharge with a current of 0.5 C for 2 h.

The foregoing 3 cycles used to form the SEI were included in the calculation, and the discharge capacity measured in the fourth cycle was considered as the discharge capacity of the 1st cycle.

After the charge and discharge was repeated 49 times under the foregoing conditions, the discharge capacity measured at the 50th time was the discharge capacity of the 50th cycle.

Capacity retention=(discharge capacity of the 50th cycle/discharge capacity of the 1st cycle)× 100%.

Test Result

The graft PVA used in Comparative Example 1 does not contain the structural unit of the ethylenically unsaturated amide monomer. In Comparative Example 2, CMC/SBR is used as a binder. In Comparative Example 3, PAA/SBR is used as a binder. In comparison, the graft PVA used in Examples 1 to 7 is simultaneously grafted with the fluorine-containing ethylenically unsaturated monomer, the ethylenically unsaturated carboxylic acid monomer, and the ethylenically unsaturated amide monomer.

modifications and variations fall within the scope of the following claims and equivalents thereof.

TABLE 1

|  |  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 |
|---|---|---|---|---|---|---|---|---|---|
| Graft PVA | (e) polyvinyl alcohol [g] | 36 | 36 | 36 | 36 | 36 | 36 | 36 | 36 |
|  | (a) 2,2,2-trifluoroethyl (meth)acrylate [g] | 14.4 | 14.4 | 14.4 | 14.4 | 14.4 | 14.4 | 14.4 | 14.4 |
|  | (b) (meth)acrylic acid [g] | 316.8 | 302.4 | 292.8 | 268.8 | 247.2 | 302.4 | 292.8 | 331.2 |
|  | (c) acrylamide [g] | 14.4 | 28.81 | 38.4 | 62.4 | 84 | 0 | 0 | 0 |
|  | (c-1) N-methylolacrylamide [g] | 0 | 0 | 0 | 0 | 0 | 28.81 | 38.4 | 0 |
|  | (d) hexyl (meth)acrylate [g] | 14.4 | 14.4 | 14.4 | 14.4 | 14.4 | 14.4 | 14.4 | 14.4 |
|  | water [g] | 7200 | 7200 | 7200 | 7200 | 7200 | 7200 | 7200 | 7200 |
|  | viscosity [cP] | 6000 | 5800 | 5800 | 5500 | 5000 | 6000 | 6200 | 7000 |
|  | pH | 10 | 10 | 10 | 10 | 10 | 10 | 10 | 5 |

TABLE 2

|  | Ex.1 Prep. Ex. 1 | Ex.2 Prep. Ex. 2 | Ex.3 Prep. Ex. 3 | Ex.4 Prep. Ex. 4 | Ex.5 Prep. Ex. 5 | Ex.6 Prep. Ex. 6 | Ex.7 Prep. Ex.7 | Comp. Ex. 1 Prep. Ex. 8 | Comp. Ex.2 CMC/SBR | Comp. Ex.3 PAA/SBR |
|---|---|---|---|---|---|---|---|---|---|---|
| Graft PVA (g) Solid content: 5.2 wt % | 36.7 | 36.7 | 36.7 | 36.7 | 36.7 | 36.7 | 36.7 | 36.7 | 0 | 0 |
| CMC (g) Solid content: 2 wt % | 0 | 0 | 0 | 0 | 0 | 0 | 0 | 0 | 39 | 0 |
| SBR (克) Solid content: 45 wt % | 0 | 0 | 0 | 0 | 0 | 0 | 0 | 0 | 2.3 | 2.3 |
| PAA (g) Solid content: 2 wt % | 0 | 0 | 0 | 0 | 0 | 0 | 0 | 0 | 0 | 39 |
| Pre-treated negative electrode active material (g) | 56.4 | 56.4 | 56.4 | 56.4 | 56.4 | 56.4 | 56.4 | 56.4 | 56.4 | 56.4 |
| Super P (g) | 1.8 | 1.8 | 1.8 | 1.8 | 1.8 | 1.8 | 1.8 | 1.8 | 1.8 | 1.8 |
| Viscosity (cP) | 4500 | 4700 | 5500 | 4800 | 5000 | 4800 | 5000 | 5500 | 4000 | NA |
| Fineness (μm) | 25 | 25 | 25 | 25 | 25 | 25 | 25 | 35 | 25 | NA |
| Slurry stability | ◎ | ◎ | ◎ | ◎ | Δ | ◎ | ◎ | Δ | X | X |
| Capacity retention (%) | 70 | 70 | 75 | 77 | 65 | 72 | 73 | 60 | 50 | NA |
| Adhesion (N) | 5 | 6 | 7 | 8 | 4 | 6 | 5.5 | 0 | 3 | NA |
| Cracking of electrode plate with high coating weight | ◎ | ◎ | ◎ | ◎ | Δ | ◎ | ◎ | X | X | X |
| Water content | ◎ | ◎ | ◎ | Δ | Δ | ◎ | Δ | Δ | — | X |

It may be learned from Table 1 and Table 2 that, compared with Comparative Examples 1 to 3, Examples 1 to 7 use the graft PVA of the present invention. The electrode plates in Examples 1 to 7 have better capacity retention, which helps to extend the service life of the battery. In addition, the electrode slurries in Examples 1 to 7 do not increase significantly in viscosity after being left overnight, showing better slurry stability. This result shows that the electrode plates in Examples 1 to 7 have a longer storage life, which can improve operation convenience. Compared with Comparative Example 3, the electrode plates in Examples 1 to 7 have lower water content. This result shows that the graft PVA of the present invention is relatively not easy to absorb moisture. Therefore, it is expected that the energy consumption required for drying can be reduced and thus the manufacturing costs can be decreased. In another aspect, the electrode plates in Examples 1 to 7 have relatively high adhesion, and are not prone to cracking after winding with a high coating weight and have adequate flexibility.

A person skilled in the art may understand that modifications and variations can be made to the present invention without departing from the scope or spirit of the present invention. Based on the foregoing content, the present invention intends to cover the modifications and variations of the present invention, and the limitation is that the

What is claimed is:

1. A polyvinyl alcohol graft copolymer, comprising a polyvinyl alcohol main chain, wherein the polyvinyl alcohol graft copolymer comprises branched chains comprising structural units derived from the following monomers:

(a) a fluorine-containing ethylenically unsaturated monomer, wherein the fluorine-containing ethylenically unsaturated monomer has a structure of formula (1):

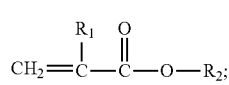

(1)

(b) an ethylenically unsaturated carboxylic acid monomer, wherein the ethylenically unsaturated carboxylic acid monomer comprises a monomer having a structure of formula (2), maleic acid, fumaric acid, itaconic acid, isocrotonic acid, α-acetoxy acrylic acid, or β-trans-aryloxy acrylic acid,

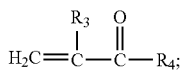
(2)

and (c) an ethylenically unsaturated amide monomer, wherein the ethylenically unsaturated amide monomer has a structure of formula (3):

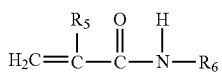
(3)

wherein $R_1$ is H, $C_1$-$C_4$ alkyl, or $C_1$-$C_4$ alkyl substituted with one or more fluorine atoms;

$R_2$ is H, $C_1$-$C_{12}$ alkyl, $C_1$-$C_{12}$ alkyl substituted with one or more fluorine atoms, aryl, aryl substituted with one or more fluorine atoms, aralkyl, or aralkyl substituted with one or more fluorine atoms, with the proviso that at least one of $R_1$ and $R_2$ is substituted with a fluorine atom;

$R_3$ is H or $C_1$-$C_4$ alkyl;

$R_4$ is —OH;

$R_5$ is H or $C_1$-$C_4$ alkyl;

$R_6$ is H, $C_1$-$C_{10}$ alkyl, aryl, aralkyl, cycloalkyl,

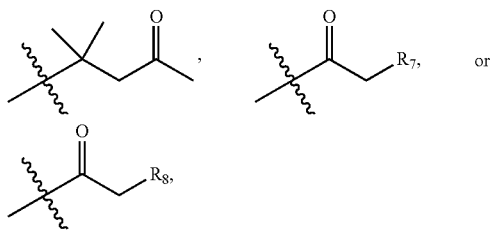

wherein the $C_1$-$C_{10}$ alkyl, aryl, aralkyl, or cycloalkyl may be unsubstituted or substituted with amino, monoalkylamino, or dialkylamino;

$R_7$ is H or $C_1$-$C_5$ alkyl, wherein the $C_1$-$C_5$ alkyl may be unsubstituted or substituted with amino, monoalkylamino, or dialkylamino;

$R_8$ is $C_1$-$C_{10}$ alkyl; and wherein a weight ratio of the ethylenically unsaturated carboxylic acid monomer to the ethylenically unsaturated amide monomer is 50:1 to 2:1.

2. The polyvinyl alcohol graft copolymer of claim 1, wherein the ethylenically unsaturated carboxylic acid monomer comprises (meth)acrylic acid or 2-ethylacrylic acid.

3. The polyvinyl alcohol graft copolymer of claim 1, wherein the ethylenically unsaturated amide monomer comprises (meth)acrylamide, N-methyl(meth)acrylamide, N-ethyl(meth)acrylamide, N-n-propyl(meth)acrylamide, N-isopropyl(meth)acrylamide, N-n-butyl(meth)acrylamide, N-sec-butyl(meth)acrylamide, N-tert-butyl(meth)acrylamide, N-hexyl(meth)acrylamide, N-benzyl(meth)acrylamide,- N-(3-dimethylaminopropyl)(meth)acrylamide, N-hydroxymethyl(meth)acrylamide, diacetone(meth)acrylamide, N-(methoxymethyl)(meth)acrylamide, N-(butoxymethyl)(meth)acrylamide, N-phenyl(meth)acrylamide, N-(3-methylphenyl)(meth)acrylamide, N-cyclohexyl(meth)acrylamide, N-cyclopentyl(meth)acrylamide, N-(meth)acryloyl ethyl carbamate, or a combination thereof.

4. The polyvinyl alcohol graft copolymer of claim 1, wherein based on 100 parts by weight of polyvinyl alcohol main chain, a content of the fluorine-containing ethylenically unsaturated monomer is 20 parts by weight or more.

5. The polyvinyl alcohol graft copolymer of claim 1, wherein based on 100 parts by weight of polyvinyl alcohol main chain, a content of the ethylenically unsaturated carboxylic acid monomer is 500 parts by weight to 2500 parts by weight.

6. An aqueous binder composition, comprising the polyvinyl alcohol graft copolymer of claim 1.

7. The aqueous binder composition of claim 6, further comprising an alkaline compound, wherein the alkaline compound comprises lithium hydroxide, sodium hydroxide, potassium hydroxide, ammonium hydroxide, or a mixture thereof.

8. An electrode slurry composition, comprising the polyvinyl alcohol graft copolymer of claim 1.

* * * * *